United States Patent
Gil

(10) Patent No.: US 9,195,617 B2
(45) Date of Patent: Nov. 24, 2015

(54) SEMICONDUCTOR MEMORY DEVICES AND SEMICONDUCTOR SYSTEMS INCLUDING THE SAME

(71) Applicant: SK hynix Inc., Icheon-si Gyeonggi-do (KR)

(72) Inventor: Chan Gi Gil, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 68 days.

(21) Appl. No.: 14/080,206

(22) Filed: Nov. 14, 2013

(65) Prior Publication Data

US 2015/0012674 A1    Jan. 8, 2015

(30) Foreign Application Priority Data

Jul. 8, 2013 (KR) ........................ 10-2013-0079952

(51) Int. Cl.
| | |
|---|---|
| G06F 3/00 | (2006.01) |
| G06F 13/28 | (2006.01) |
| G06F 13/12 | (2006.01) |
| G06F 13/38 | (2006.01) |
| G06F 13/10 | (2006.01) |
| G06F 3/06 | (2006.01) |
| G06F 11/10 | (2006.01) |
| G06F 21/79 | (2013.01) |

(52) U.S. Cl.
CPC .............. G06F 13/10 (2013.01); G06F 3/0679 (2013.01); G06F 11/108 (2013.01); G06F 21/79 (2013.01)

(58) Field of Classification Search
CPC ...... G06F 3/0679; G06F 11/108; G06F 21/79
USPC ........................................... 710/24, 5, 22, 74
See application file for complete search history.

(56) References Cited

U.S. PATENT DOCUMENTS

| | | | | |
|---|---|---|---|---|
| 6,606,705 B1* | 8/2003 | Volk | ................... | G06F 13/4072 710/310 |
| 2002/0054515 A1* | 5/2002 | Kang | ................... | G11C 7/1045 365/189.05 |
| 2002/0054528 A1* | 5/2002 | Tabata | ................. | G11C 16/344 365/218 |
| 2006/0055387 A1* | 3/2006 | Steele | ................... | H02M 3/158 323/283 |
| 2009/0196107 A1* | 8/2009 | Ogasawara | .......... | G11C 7/1006 365/189.05 |
| 2010/0309744 A1* | 12/2010 | Park | .................... | G06F 13/1689 365/233.11 |
| 2013/0070536 A1* | 3/2013 | Takai | ....................... | G11C 7/04 365/189.05 |

FOREIGN PATENT DOCUMENTS

| | | |
|---|---|---|
| KR | 1020080107760 A | 12/2008 |
| KR | 100942947 B1 | 2/2010 |

* cited by examiner

*Primary Examiner* — Idriss N Alrobaye
*Assistant Examiner* — Getente A Yimer
(74) *Attorney, Agent, or Firm* — William Park & Associates Ltd.

(57) ABSTRACT

Semiconductor systems are provided. The semiconductor system includes a controller and a semiconductor memory device. The controller generates a first command signal and receives a foreground data to generate a foreground control signal for controlling a drivability of the foreground data and to generate a second command signal. The semiconductor memory device receives the first command signal to output a pattern data as the foreground data through a foreground input/output (I/O) line, stores the foreground control signal therein in response to the second command signal, and controls the drivability of the foreground data according to the foreground control signal.

18 Claims, 7 Drawing Sheets

_US 9,195,617 B2_

SEMICONDUCTOR MEMORY DEVICES AND SEMICONDUCTOR SYSTEMS INCLUDING THE SAME

CROSS-REFERENCE TO RELATED APPLICATION

The present application claims priority under 35 U.S.C 119(a) to Korean Application No. 10-2013-0079952, filed on Jul. 8, 2013, in the Korean Intellectual Property Office, which is incorporated herein by reference in its entirety as set forth in full.

BACKGROUND

1. Field of the Invention

Embodiments of the present disclosure relate to semiconductor memory devices and semiconductor systems including the same.

2. Description of the Related Art

In general, semiconductor memory devices may include a plurality of memory cells. As the semiconductor memory devices become more highly integrated, the number of the memory cells in each of the semiconductor memory devices has been rapidly increased. Each of the semiconductor memory devices including the memory cells may execute a read operation and/or a write operation in response to control signals provided from a controller to store (or write) input data in the memory cells and/or to output (or read) the data stored in the memory cells.

Meanwhile, as the operation speed of semiconductor systems including the semiconductor memory devices and the controllers get faster, it has become more and more important to control or adjust the timing between a command signal, an address signal and data that the controller applies to semiconductor memory devices. That is, the timing between various output signals of the controller has to be accurately controlled for reliable and accurate operations of the semiconductor systems. In particular, as the transmission speed (e.g., input and output speeds) of the data become faster, it may be necessary to accurately find out delay times of the data on channels between the controller and the semiconductor memory device. Finding out information (e.g., the delay times) on the channels through which the data are transmitted is referred to as "channel training".

Referring to FIG. 1, a first output data DOUT<1> has stable levels at rising edges "T1" and "T3" and falling edges "T2" and "T4" of a clock signal CLK without any level transitions. Thus, no data errors occur in the first output data DOUT<1>.

In contrast, a level of a second output data DOUT<2> changes at the rising edges "T1" and "T3" and the falling edges "T2" and "T4" of the clock signal CLK. Thus, data errors may occur in the second output data DOUT<2>.

Similarly, a level of a third output data DOUT<3> changes at the rising edges "T1" and "T3" and the falling edges "T2" and "T4" of the clock signal CLK. Thus, data errors may also occur in the third output data DOUT<3>.

According to FIG. 1, if the first output data DOUT<1> has a normal delay time, the second output data DOUT<2> may have an abnormal delay time which is greater than the normal delay time and the third output data DOUT<3> may have an abnormal delay time which is less than the normal delay time.

If a delay time of data changes due to process/voltage/temperature (PVT) conditions, levels of the data may change at rising edges and falling edges of a clock signal. In such a case, data errors may occur to degrade the reliability of the data.

SUMMARY

According to an embodiment, a semiconductor system includes a controller and a semiconductor memory device. The controller generates a first command signal. Further, the controller receives a foreground data to generate a foreground control signal for controlling a drivability of the foreground data and to generate a second command signal. The semiconductor memory device receives the first command signal to output a pattern data as the foreground data through a foreground input/output (I/O) line, stores the foreground control signal therein in response to the second command signal, and controls the drivability of the foreground data according to the foreground control signal.

According to an embodiment, a semiconductor memory device includes a drive signal generator and an output buffer. The drive signal generator outputs a foreground control signal for controlling a drivability of a foreground data as a foreground drive signal in response to a first command signal, stores the foreground control signal therein in response to a second command signal, and loads a pattern data having a predetermined level combination on a foreground I/O line. The output buffer generates the foreground data in response to a signal loaded on the foreground I/O line and outputs the foreground data through a first pad. A drivability of the foreground data is controlled according to the foreground drive signal.

BRIEF DESCRIPTION OF THE DRAWINGS

Embodiments of the present invention will become more apparent in view of the attached drawings and accompanying detailed description, in which.

DETAILED DESCRIPTION OF THE EMBODIMENTS

Embodiments of the present invention will be described hereinafter with reference to the accompanying drawings. However, the embodiments described herein are for illustrative purposes only and are not intended to limit the scope of the invention.

Figure 1:
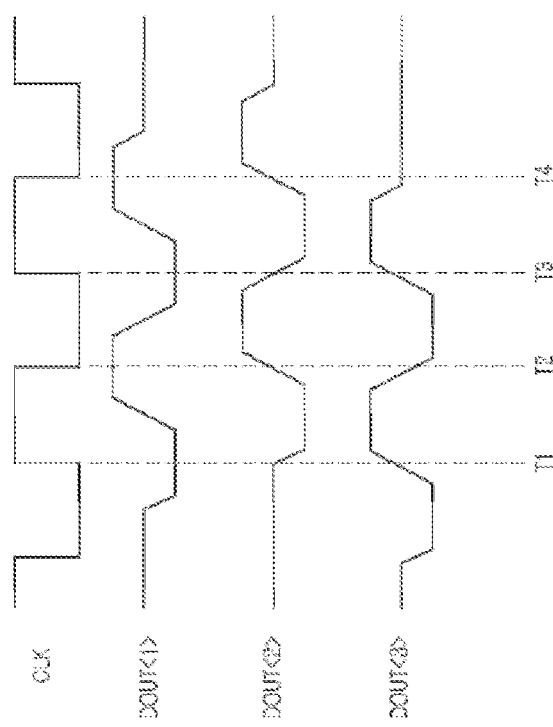
FIG. 1 is a timing diagram illustrating an abnormal operation of a general semiconductor system according to variation of a data delay time.
Figure 2:
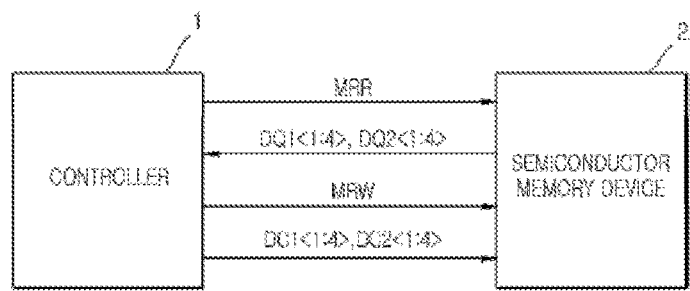
FIG. 2 is a block diagram illustrating a semiconductor system according to an embodiment of the present invention.

Referring to FIG. 2, a semiconductor system according to an embodiment of the present invention may include a controller 1 and a semiconductor memory device 2.

The controller 1 may generate a first command signal MRR, first to fourth foreground control signals DC1<1:4>, first to fourth background control signals DC2<1:4> and a second command signal MRW. The first to fourth foreground control signals DC1<1:4>, first to fourth background control signals DC2<1:4> and a second command signal MRW may be generated by first to fourth foreground data DQ1<1:4> provided from the semiconductor memory device 2.

The semiconductor memory device 2 may be configured to output the first to fourth foreground data DQ1<1:4> and the first to fourth background data DQ2<1:4> in response to the first command signal MRR. Further, the semiconductor memory device 2 may be configured to store the first to fourth foreground control signals DC1<1:4> and the first to fourth background control signals DC2<1:4> therein in response to the second command signal MRW. Moreover, the semiconductor memory device 2 may be configured to control drivabilities of the first to fourth foreground data DQ1<1:4> and the first to fourth background data DQ2<1:4> according to a level combination of the first to fourth foreground control signals DC1<1:4> and the first to fourth background control signals DC2<1:4>. The first to fourth foreground control signals DC1<1:4> may control the drivability of the first to fourth foreground data DQ1<1:4> and the first to fourth background control signals DC2<1:4> may control the drivability of the first to fourth background data DQ2<1:4>.

Figure 3:
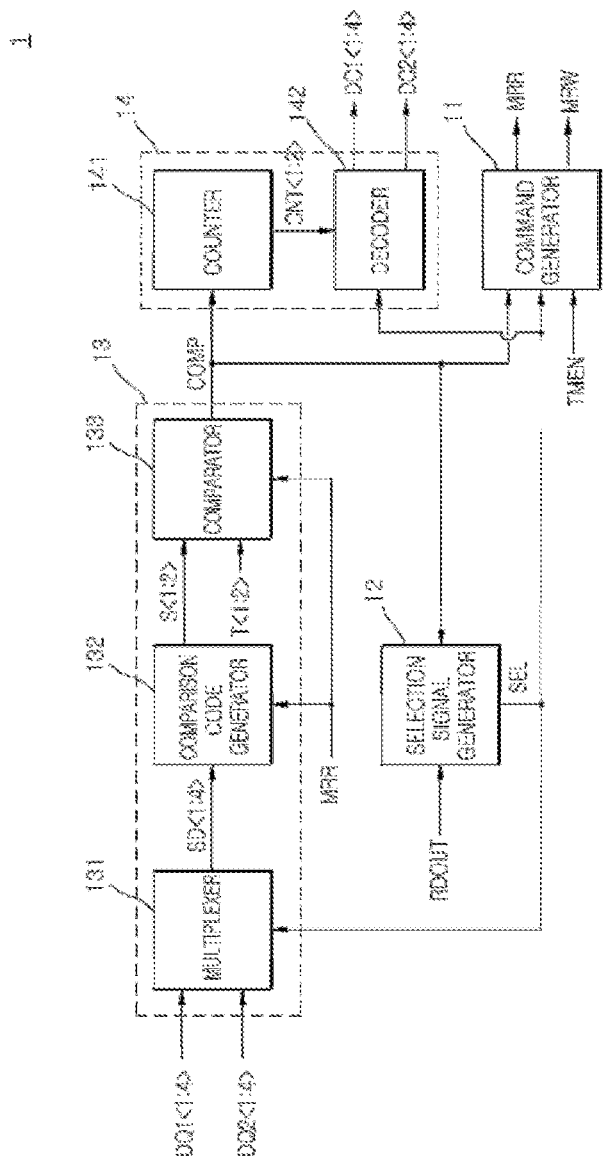
FIG. 3 is a block diagram illustrating a controller included in the semiconductor system of FIG. 2.

As shown in FIG. 3, the controller 1 may include a command generator 11, a selection signal generator 12, a comparison signal generator 13 and a control signal generator 14.

The command generator 11 may be configured to generate a pulse of the first command signal MRR in response to a test enable signal TMEN enabled when a test mode starts. Further the command generator 11 may be also configured to generate a pulse of the first command signal MRR even when a level combination of the first to fourth foreground data DQ1<1:4> or the first to fourth background data DQ2<1:4> is different from a predetermined level combination. Further, the command generator 11 may be configured to generate a pulse of the second command signal MRW when the level combination of the first to fourth foreground data DQ1<1:4> or the first to fourth background data DQ2<1:4> is identical to the predetermined level combination.

The selection signal generator 12 may be configured to generate a selection signal SEL having a first level and a second level which is opposite to the first level.

The selection signal may become the first level (e.g., a logic "low" level) if a pulse of a read latency signal RDOUT is inputted after a predetermined time elapses from a time that the pulse of the first command signal MRR is generated. Further, the selection signal SEL may become the second level (e.g., a logic "high" level) if the level combination of the first to fourth foreground data DQ1<1:4> or the first to fourth background data DQ2<1:4> is identical to the predetermined level combination after the pulse of the read latency signal RDOUT is inputted. The read latency signal RDOUT may correspond to a signal which is enabled after the semiconductor memory device 2 outputs data in response to the first command signal MRR.

The comparison signal generator 13 may include a multiplexer 131, a comparison code generator 132 and a comparator 133. The multiplexer 131 may be configured to output the first to fourth foreground data DQ1<1:4> as first to fourth selection data SD<1:4> when the selection signal SEL has the first level (e.g., a logic "low" level) and output the first to fourth background data DQ2<1:4> as the first to fourth selection data SD<1:4> when the selection signal SEL has the second level (e.g., a logic "high" level). The comparison code generator 132 may be configured to generate first and second comparison codes S<1:2> whose level combination is determined according to a level combination of the first to fourth selection data SD<1:4>. The comparator 133 may be configured to generate a pulse of a comparison signal COMP when a level combination of the first and second comparison codes S<1:2> is different from a level combination of first and second test codes T<1:2> having a predetermined level combination. For example, the comparison signal generator 13 may generate a pulse of the comparison signal COMP when the selection signal SEL has the first level (e.g., a logic "low" level) and the first to fourth foreground data DQ1<1:4> have a level combination which is different from the predetermined level combination. Further, the comparison signal generator 13 may also generate a pulse of the comparison signal COMP even when the selection signal SEL has the second level (e.g., a logic "high" level) and the first to fourth background data DQ2<1:4> has a level combination which is different from the predetermined level combination. A level combination of the first and second comparison codes S<1:2> may vary according to the number of bits having a logic "high" level among the bits of the first to fourth selection data SD<1:4>. In addition, the predetermined level combination of the first and second test codes T<1:2> may be set such that the first test code T<1> has a logic "high" level and the second test code T<2> has a logic "low" level. However, the predetermined level combination of the first and second test codes T<1:2> may be set to be different according to the embodiments. Further, the comparison code generator 132 and the comparator 133 may be received the first command signal MRR, as a control signal.

The level combination of the first and second comparison codes S<1:2> according to the number of the bits having a logic "high" level among the bits of the first to fourth selection data SD<1:4> may be summarized as described in the following Table 1.

TABLE 1

| The number of the bits having a logic "high" level among the bits of the first to fourth selection data SD<1:4> | S<2> | S<1> |
|---|---|---|
| 0 | Low (L) | Low (L) |
| 1 | Low (L) | High (H) |
| 2 | High (H) | Low (L) |
| 3 | High (H) | High (H) |

The control signal generator 14 may include a counter 141 and a decoder 142. The counter 141 may be configured to output first and second count signals CNT<1:2>. The first and second count signals CNT<1:2> may be counted when a pulse of the comparison signal COMP is inputted. When the selection signal SEL has the first level (e.g., a logic "low" level), the decoder 142 may decode the first and second count signals CNT<1:2> to generate first to fourth foreground control signals DC1<1:4>. Further, when the selection signal SEL has the second level (e.g., a logic "high" level), the decoder 142 may decode the first and second count signals CNT<1:2> to generate first to fourth background control signals DC2<1:4>. That is, the control signal generator 14 may be configured to generate the first to fourth foreground control signals DC1<1:4> whose level combination changes when the selection signal SEL has the first level (e.g., a logic "low" level) and a pulse of the comparison signal COMP is inputted. Further, the control signal generator 14 may be configured to generate the first to fourth background control signals DC2<1:4> whose level combination changes when the selection signal SEL has the second level (e.g., a logic "high" level) and a pulse of the comparison signal COMP is inputted.

For example, a level combination of the first to fourth foreground control signals DC1<1:4> according to a level combination of the first and second count signals CNT<1:2> may be summarized as described in the following Table 2.

TABLE 2

| CNT<2> | CNT<1> | DC1<4> | DC1<3> | DC1<2> | DC1<1> |
|---|---|---|---|---|---|
| L | L | L | L | L | H |
| L | H | L | L | H | H |
| H | L | L | H | H | H |
| H | H | H | H | H | H |

For example, a level combination of the first to fourth background control signals DC2<1:4> according to a level combination of the first and second count signals CNT<1:2> may be summarized as described in the following Table 3.

TABLE 3

| CNT<2> | CNT<1> | DC2<4> | DC2<3> | DC2<2> | DC2<1> |
|---|---|---|---|---|---|
| L | L | L | L | L | H |
| L | H | L | L | H | H |
| H | L | L | H | H | H |
| H | H | H | H | H | H |

Figure 4:
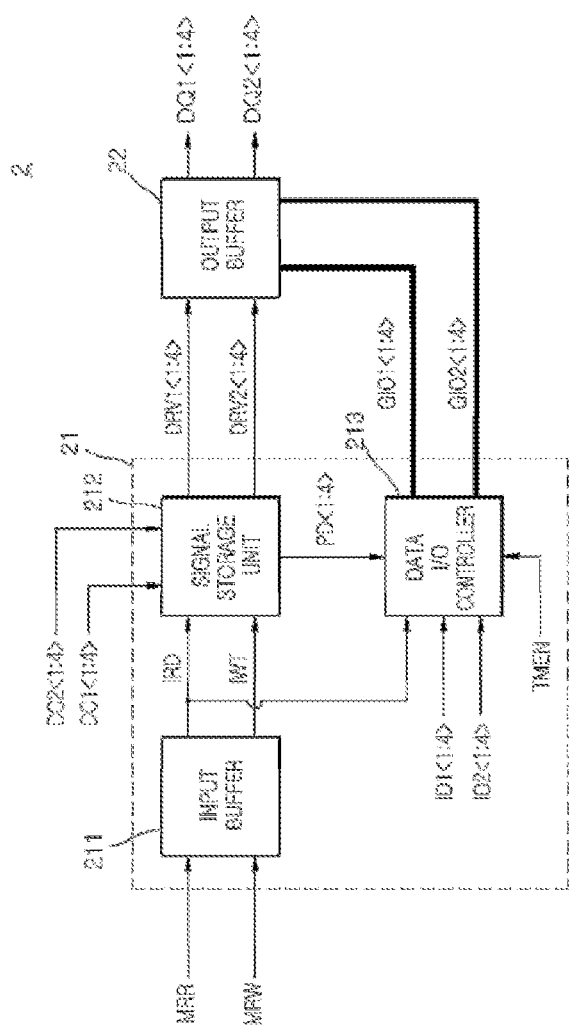
FIG. 4 is a block diagram illustrating a semiconductor memory device included in the semiconductor system of FIG. 2.

Referring to FIG. 4, the semiconductor memory device 2 may include a drive signal generator 21 and an output buffer 22.

The drive signal generator 21 may include an input buffer 211, a signal storage unit 212 and a data input/output (I/O) controller 213. The input buffer 211 may be configured to buffer the first command signal MRR and the second command signal MRW to generate a first internal command signal IRD and a second internal command signal IWT, respectively. The signal storage unit 212 may be configured to output the first to fourth foreground control signals DC1<1:4> as first to fourth foreground drive signals DRV1<1:4> and may output the first to fourth background control signals DC2<1:4> as first to fourth background drive signals DRV2<1:4> when the first internal command signal IRD is inputted. Further, the signal storage unit 212 may be configured to store the first to fourth foreground control signals DC1<1:4> and the first to fourth background control signals DC2<1:4> therein when the second internal command signal IWT is inputted. Moreover, the signal storage unit 212 may be configured to output first to fourth pattern data PD<1:4> having a predetermined level combination in response to the first internal command signal IRD. The data I/O controller 213 may load the first to fourth pattern data PD<1:4> on first to fourth foreground I/O lines GIO1<1:4> and on first to fourth background I/O lines GIO2<1:4>, respectively, when the test enable signal TMEN is enabled. Further, the data I/O controller 213 may load first to fourth foreground internal data ID1<1:4> stored in memory cells on the first to fourth foreground I/O lines GIO1<1:4> and may load first to fourth background internal data ID2<1:4> stored in memory cells on the first to fourth background I/O lines GIO2<1:4> when the test enable signal TMEN is disabled. For example, the predetermined level combination of the first to fourth pattern data PD<1:4> may be set such that the first and third pattern data PD<1> and PD<3> have a logic "low" level and the second and fourth pattern data PD<2> and PD<4> have a logic "high" level. However, the predetermined level combination of the first to fourth pattern data PD<1:4> may be set to be different according to the embodiment.

The output buffer 22 may be configured to control the drivability of the first to fourth foreground I/O lines GIO1<1:4> according to a level combination of the first to fourth foreground drive signals DRV1<1:4> to generate the first to fourth foreground data DQ1<1:4>. Further, the output buffer 22 may be control the drivability of the first to fourth background I/O lines GIO2<1:4> according to a level combination of the first to fourth background drive signals DRV2<1:4> to generate the first to fourth background data DQ2<1:4>.

Figure 5:
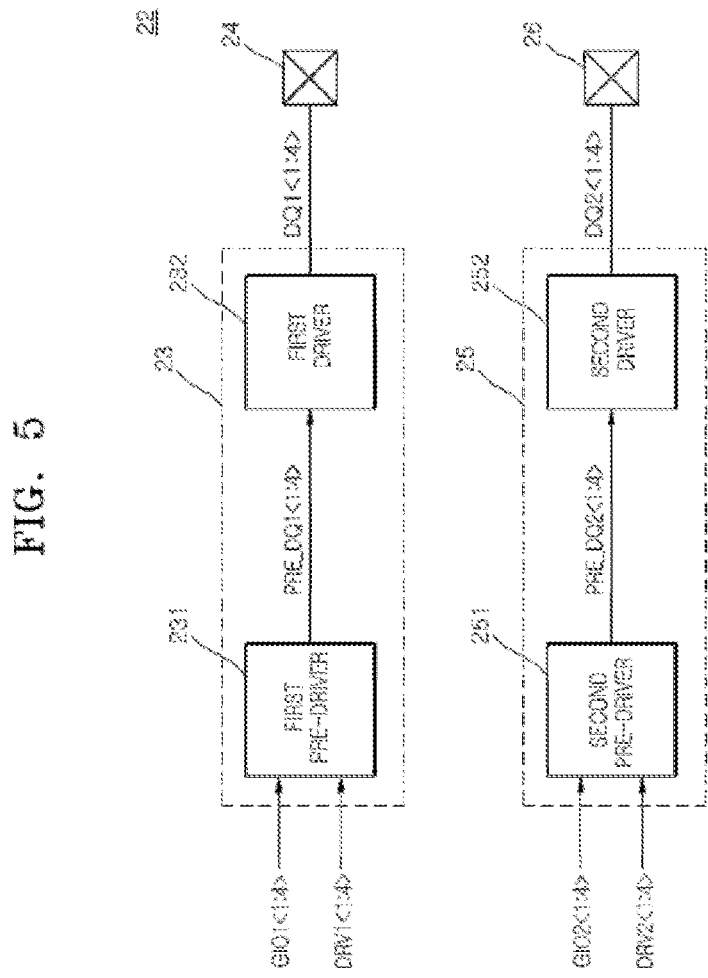
FIG. 5 is a block diagram illustrating an output buffer included in the semiconductor memory device of FIG. 4.

Referring to FIG. 5, the output buffer 22 may include a first output buffer 23 and a second output buffer 25.

The first output buffer 23 may include a first pre-driver 231 and a first driver 232. The first pre-driver 231 may be configured to control the drivability of the first to fourth foreground I/O lines GIO1<1:4> according to a level combination of the first to fourth foreground drive signals DRV1<1:4> to generate first to fourth pre-foreground data PRE_DQ1<1:4>. The first driver 232 may be configured to buffer the first to fourth pre-foreground data PRE_DQ1<1:4> to output the first to fourth foreground data DQ1<1:4> through a first pad 24.

The second output buffer 25 may include a second pre-driver 251 and a second driver 252. The second pre-driver 251 may be configured to control the drivability of the first to fourth background I/O lines GIO2<1:4> according to a level combination of the first to fourth background drive signals DRV2<1:4> to generate first to fourth pre-background data PRE_DQ2<1:4>. The second driver 252 may be configured to buffer the first to fourth pre-background data PRE_DQ2<1:4> to output the first to fourth background data DQ2<1:4> through a second pad 26.

Figure 6:
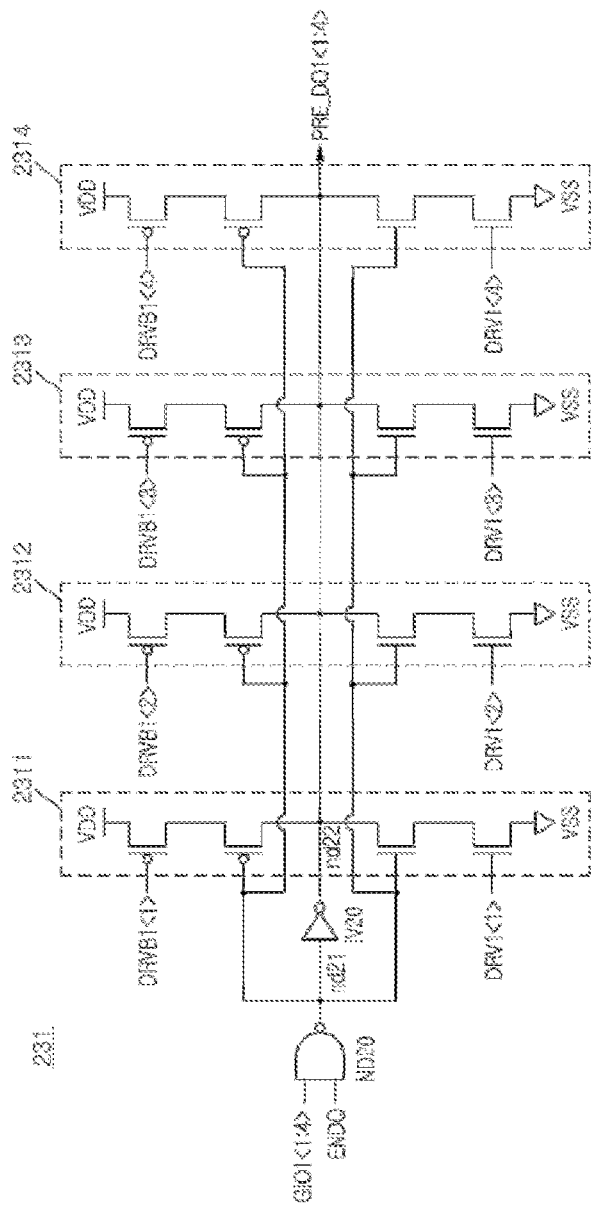
FIG. 6 is a circuit diagram illustrating a first pre-decoder included in the output buffer of FIG. 5.

Referring to FIG. 6, the first pre-driver 231 may be configured to include a first buffering unit 2310, a first inverter IV20, a first driving unit 2311, a second driving unit 2312, a third driving unit 2313 and a fourth driving unit 2314. The first buffering unit 2310 may be configured to buffer signals loaded on the first to fourth foreground I/O lines GIO1<1:4> in response to a read enable signal ENDQ enabled to have a logic "high" level when the first command signal MRR is inputted, thereby outputting the buffered signals through a first node ND21. For example, the first buffering unit 2310 may include a NAND gate ND20.

The first inverter IV20 may inversely buffer a signal on the first node ND21 to output the inversely buffered signal through a second node ND22. The first driving unit 2311 may receive the first foreground drive signal DRV1<1> and a first complementary foreground drive signal DRVB1<1> to drive the second node ND22. The second driving unit 2312 may receive the second foreground drive signal DRV1<2> and a second complementary foreground drive signal DRVB1<2> to drive the second node ND22. The third driving unit 2313 may receive the third foreground drive signal DRV1<3> and a third complementary foreground drive signal DRVB1<3> to drive the second node ND22. The fourth driving unit 2314 may receive the fourth foreground drive signal DRV1<4> and a fourth complementary foreground drive signal DRVB1<4> to drive the second node ND22. That is, the first pre-driver 231 may generate the first to fourth pre-foreground data PRE_DQ1<1:4> whose drivabilities are controlled according to a level combination of the first to fourth foreground drive signals DRV1<1:4>. The first to fourth complementary foreground drive signals DRVB1<1:4> may correspond to inverted signals of the first to fourth foreground drive signals DRV1<1:4>, respectively.

Figure 7:
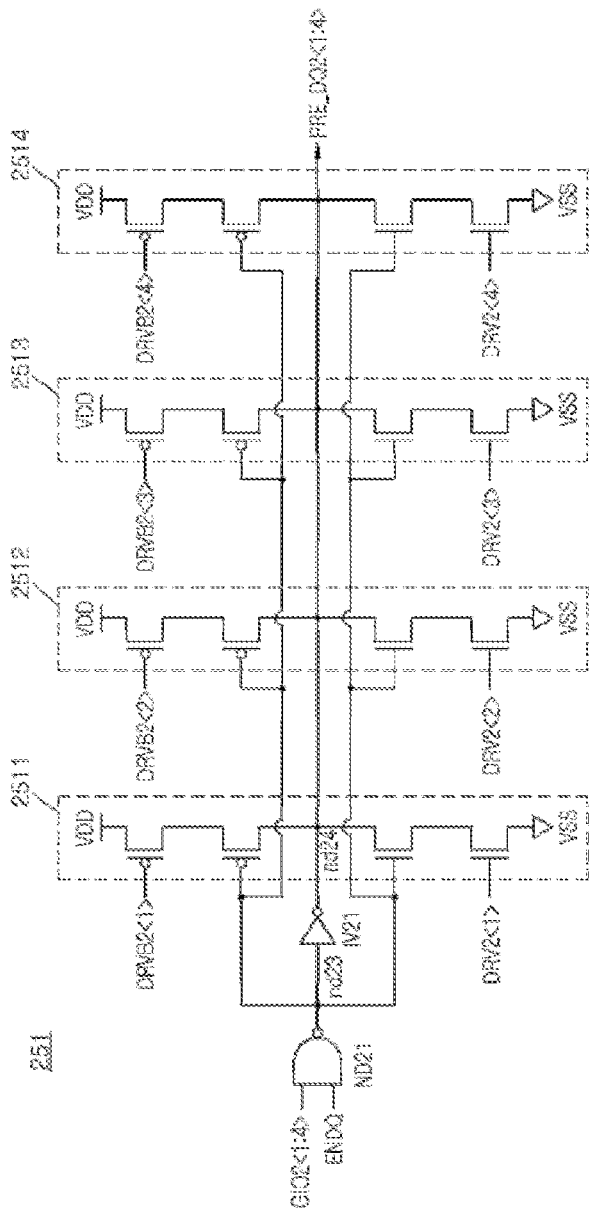
FIG. 7 is a circuit diagram illustrating a second pre-decoder included in the output buffer of FIG. 5.

Referring to FIG. 7, the second pre-driver 251 may be configured to include a second buffering unit 2510, a second inverter IV21, a fifth driving unit 2511, a sixth driving unit 2512, a seventh driving unit 2513 and a eighth driving unit 2514. The second buffering unit 2510 may be configured to buffer signals loaded on the first to fourth background I/O lines GIO2<1:4> in response to the read enable signal ENDQ enabled to have a logic "high" level when the first command signal MRR is inputted, thereby outputting the buffered signals through a third node ND23. For example, the second buffering unit 2510 may include NAND gate ND21. The second inverter IV21 may inversely buffer a signal on the third node ND23 to output the inversely buffered signal through a fourth node ND24. The fifth driving unit 2511 may receive the first background drive signal DRV2<1> and a first complementary background drive signal DRVB2<1> to drive the fourth node ND24. The sixth driving unit 2512 may receive the second background drive signal DRV2<2> and a second complementary background drive signal DRVB2<2> to drive the second node ND22. The seventh driving unit 2513 may receive the third background drive signal DRV2<3> and a third complementary background drive signal DRVB2<3> to drive the second node ND22. The eighth driving unit 2514 may receive the fourth background drive signal DRV2<4> and a fourth complementary background drive signal DRVB2<4> to drive the second node ND22. That is, the second pre-driver 251 may generate the first to fourth pre-background data PRE_DQ2<1:4> whose drivabilities are controlled according to a level combination of the first to fourth background drive signals DRV2<1:4>. The first to fourth complementary background drive signals DRVB2<1:4> may correspond to inverted signals of the first to fourth background drive signals DRV2<1:4>, respectively.

Operations of the semiconductor system as set forth above will be described hereinafter with reference to FIGS. 2 to 7 in conjunction with an example that drivabilities of the first to fourth foreground data DQ1<1:4> are controlled when delay times of the first to fourth foreground data DQ1<1:4> are greater than a normal delay time. The following description will be developed in conjunction with an example that the first to fourth pattern data PD<1:4> are set to have a level combination of 'L,H,L,H' and the first to fourth foreground control signals DC1<1:4> are set to have a level combination of 'L,L,L,H'.

The command generator 11 of the controller 1 may generate a pulse of a first command signal MRR in response to a test enable signal TMEN enabled when a test mode starts. The selection signal generator 12 may generate a selection signal SEL having a first level (e.g., a logic "low" level) if a pulse of a read latency signal RDOUT is inputted after a predetermined time elapses from a time that the pulse of the first command signal MRR is generated.

In the semiconductor memory device 2, the input buffer 211 of the drive signal generator 21 may buffer the pulse of the first command signal MRR to generate a first internal command signal IRD. The signal storage unit 212 may receive the first internal command signal IRD provided from the input buffer 211 to output first to fourth pattern data PD<1:4> having a level combination of 'L,H,L,H'. The data I/O controller 213 may receive the first internal command signal IRD provided from the input buffer 211, to load the first to fourth pattern data PD<1:4> having the level combination of 'L,H,L,H' on the first to fourth foreground I/O lines GIO1<1:4>. The first output buffer 23 may buffer signals loaded on the first to fourth foreground I/O lines GIO1<1:4> to generate first to fourth foreground data DQ1<1:4>. In such a case, because the first to fourth foreground control signals DC1<1:4> have a level combination of 'L,L,L,H', the first to fourth foreground drive signals DRV1<1:4> may also have a level combination of 'L,L,L,H'. That is, only the first foreground drive signal DRV1<1> among the first to fourth foreground drive signals DRV1<1:4> may have a logic "high" level. Thus, only the first driving unit 2311 among the first to fourth driving units 2311, 2312, 2313 and 2314 constituting the first pre-driver 231 may operate to drive the second node ND22.

The multiplexer 131 of the comparison signal generator 13 may receive the selection signal SEL having the first level (e.g., a logic "low" level) to output the first to fourth foreground data DQ1<1:4> as first to fourth selection data SD<1:4>. The comparison code generator 132 may generate first and second comparison codes S<1:2> whose level combination is determined according to a level combination of the first to fourth selection data SD<1:4>. For example, if the delay times of the first to fourth foreground data DQ1<1:4> are greater than a normal delay time, levels of the first to fourth foreground data DQ1<1:4> may change at a rising edge and a falling edge of a clock signal. Thus, the comparison code generator 132 does not generate the first and second comparison codes S<1:2> having a level combination of 'H,L'. The comparator 133 may compare the first and second comparison codes S<1:2> with first and second test codes T<1:2> having a level combination of 'H,L' to generate a pulse of a comparison signal COMP. That is, since the first and second comparison codes S<1:2> does not have the level combination of 'H,L', the first and second comparison codes S<1:2> are not identified to the first and second test codes T<1:2> so that the comparator 133 may generate the comparison signal COMP. The level combination 'H,L' of the first and second test codes T<1:2> means that the first test code T<1> has a logic "low" level and the second test code T<2> has a logic "high" level. In addition, because the number of bits having a logic "high" level among the bits of the first to fourth pattern data PD<1:4> is two, the first and second test codes T<1:2> may be set to have a level combination of 'H,L'.

The counter 141 of the control signal generator 14 may count first and second count signals CNT<1:2> in response to a pulse of the comparison signal COMP to generate the first and second count signals CNT<1:2> having a level combination of 'L,H'. The level combination 'L,H' of the first and second count signals CNT<1:2> means that the first count signal CNT<1> has a logic "high" level and the second count signal CNT<2> has a logic "low" level. The decoder 142 may decode the first and second count signals CNT<1:2> in response to the selection signal SEL. Since the selection signal SEL has the first level (e.g., a logic "low" level), the decoder 142 may output the first to fourth foreground control signals DC1<1:4> having a level combination of 'L,L,H,H', as an output signals thereof.

The command generator 11 may receive the pulse of a comparison signal COMP provided from the comparator 133 to generate a pulse of the first command signal MRR. The selection signal generator 12 may generate the selection signal SEL having the first level (e.g., a logic "low" level) in response to the read latency signal RDOUT enabled after a predetermined time elapses from a of time that the pulse of the first command signal MRR is generated and the comparison signal COMP.

The input buffer 211 of the semiconductor memory device 2 may buffer the pulse of the first command signal MRR provided from the command generator 11 of the controller 1 to generate the first internal command signal IRD. The signal storage unit 212 may receive the first internal command signal IRD to output first to fourth foreground control signals DC1<1:4> as the first to fourth foreground drive signals DRV1<1:4> and to output the first to fourth pattern data PD<1:4> having a level combination of 'L,H,L,H'. The data I/O controller 213 may receive the first internal command signal IRD to load the first to fourth pattern data PD<1:4> having the level combination of 'L,H,L,H' on the first to fourth foreground I/O lines GIO1<1:4>. The first output buffer 23 of the output buffer 22 may buffer signals loaded on the first to fourth foreground I/O lines GIO1<1:4> in response to the first to fourth foreground drive signals DRV1<1:4> having a level combination of 'L,L,H,H' to generate the first to fourth foreground data DQ1<1:4> whose drivabilities are increased. In such a case, because the first to fourth foreground drive signals DRV1<1:4> have a level combination of 'L,L,H,H', the first and second driving units 2311 and 2312 among the first to fourth driving units 2311, 2312, 2313 and 2314 constituting the first pre-driver 231 may operate to increase the drivabilities of the first to fourth foreground data DQ1<1:4>.

The multiplexer 131 of the comparison signal generator 13 may receive the selection signal SEL having the first level (e.g., a logic "low" level) to output the first to fourth foreground data DQ1<1:4> as the first to fourth selection data SD<1:4>. The comparison code generator 132 may generate the first and second comparison codes S<1:2> whose level combination varies according to a level combination of the first to fourth selection data SD<1:4>. In such a case, because the drivabilities of the first to fourth foreground data DQ1<1:4> have been increased, level transition periods of the first to fourth foreground data DQ1<1:4> may become shorter. Thus, the rising edge and the falling edge of the clock signal may occurs after the level transition periods of the first to fourth foreground data DQ1<1:4>. As a result, the first and second comparison codes S<1:2> may be generated to have a level combination of 'H,L'. The comparator 133 may compare the first and second comparison codes S<1:2> with first and second test codes T<1:2> having a level combination of 'H,L' not to generate a pulse of the comparison signal COMP.

The counter 141 of the control signal generator 14 does not count the first and second count signals CNT<1:2>. The decoder 142 may decode the first and second count signals CNT<1:2> to generate the first to fourth foreground control signals DC1<1:4> having a level combination of 'L,L,H,H' because the selection signal SEL has the first level (e.g., a logic "low" level).

The selection signal generator 12 may generate the selection signal SEL having a second level (e.g., a logic "high" level) because the pulse of the read latency signal RDOUT is inputted but no pulse of the comparison signal COMP is inputted after a predetermined time elapses from a time that the pulse of the first command signal MRR is generated. Thus, the command generator 11 may generate a pulse of a second command signal MRW because the selection signal SEL having the second level is inputted but no pulse of the comparison signal COMP is inputted.

The input buffer 211 of the semiconductor memory device 2 may buffer the pulse of the second command signal MRW to generate a second internal command signal IWT. The signal storage unit 212 may receive the second internal command signal IWT to store the first to fourth foreground control signals DC1<1:4> therein.

After the test mode terminates, the data I/O controller 213 may load first to fourth foreground internal data ID1<1:4> stored in memory cells on the first to fourth foreground I/O lines GIO1<1:4>. The first output buffer 23 may output the first to fourth foreground data DQ1<1:4> whose drivabilities are increased to a level combination 'L,L,H,H' of the first to fourth foreground drive signals DRV1<1:4>.

The semiconductor system described above may control drivabilities of I/O lines to change level transition periods of data even though delay times of the data vary according to process/voltage/temperature (PVT) conditions. As a result, reliability of the data may be improved.

While certain embodiments have been described above, it will be understood to those skilled in the art that the embodiments described are by way of example only. Accordingly, the semiconductor integrated circuit described herein should not be limited based on the described embodiments. Rather, the semiconductor integrated circuit described herein should only be limited in light of the claims that follow when taken in conjunction with the above description and accompanying drawings.

What is claimed is:

1. A semiconductor system comprising:
   a controller configured to generate a first command signal, a foreground control signal for controlling a drivability of a foreground data and a second command signal; and
   a semiconductor memory device configured to output a pattern data as the foreground data through a foreground input/output (I/O) line in response to the first command signal, configured to store the foreground control signal therein in response to the second command signal, and configured to control the drivability of the foreground data according to the foreground control signal,
   wherein the drivability of the foreground data is controlled by a plurality of drivers according to the foreground drive signal, and wherein the foreground control signal is configured to be varied a level combination of the foreground control signal according to a delay time of the foreground data outputted through the foreground I/O line.

2. The semiconductor system of claim 1, wherein the controller includes:
   a comparison signal generator configured to generate a comparison signal including a pulse created when the background data has a level combination which is different from that of the pattern data;
   a control signal generator configured to change a level combination of the foreground control signal in response to the pulse of the comparison signal; and
   a command generator configured to generate the first command signal in response to a test enable signal when the pulse of the comparison signal is inputted and configured to generate the second command signal when no pulse of the comparison signal is generated.

3. The semiconductor system of claim 2, wherein the comparison signal generator includes:
   a multiplexer configured to output the foreground data as a selection data in response to a selection signal;
   a comparison code generator configured to generate a comparison code which is disabled in response to a pulse of the first command signal and whose level combination changes according to a level combination of the selection data; and
   a comparator configured to compare the comparison code with a test code having a predetermined level combination to generate the comparison signal, wherein the comparison signal is disabled in response to the pulse of the first command signal.

4. The semiconductor system of claim 2, wherein the control signal generator includes:
   a counter configured to output a count signal that are counted in response to the pulse of the comparison signal; and a decoder configured to decode the count signal in response to a selection signal to generate the foreground control signal.

5. The semiconductor system of claim 1, wherein the semiconductor memory device includes:
   a drive signal generator configured to output the foreground control signal as a foreground drive signal and configured to load the pattern data having a predetermined level combination on the foreground I/O line; and
   an output buffer configured to generate the foreground data in response to a signal loaded on the foreground I/O line, wherein the drivability of the foreground data is controlled according to the foreground drive signal.

6. The semiconductor system of claim 5, wherein the drive signal generator includes:
   an input buffer configured to buffer the first command signal and the second command signal, to generate a first internal command signal and a second internal command signal, respectively;
   a signal storage unit configured to output the foreground control signal as the foreground drive signal and the pattern data in response to the first internal command signal and configured to store the foreground control signal therein in response to the second internal command signal; and
   a data I/O controller configured to load the pattern data on the foreground I/O line in response to the first internal command signal and configured to load an internal data on the foreground I/O line when a test mode terminates.

7. The semiconductor system of claim 6, wherein the controller receives a background data to generate a background control signal for controlling a drivability of the background data.

8. The semiconductor system of claim 7, wherein the semiconductor memory device is configured to output the pattern data as the background data through a background I/O line in response to the first command signal, configured to store the background control signal therein in response to the second command signal, and configured to control the drivability of the background data according to the background control signal.

9. The semiconductor system of claim 8, wherein the background control signal is configured to be varied a level combination of the background control signal according to a delay time of the background data outputted through the background I/O line.

10. The semiconductor system of claim 7, wherein the controller is configured to generate the selection signal having a first level in response to a read latency signal including a pulse generated after a predetermined time elapses from a time that the first command signal is inputted and configured to generate the selection signal having a second level when no pulse of the comparison signal is generated.

11. The semiconductor system of claim 10, wherein the multiplexer is configured to output the foreground data as the selection data when the selection signal has the first level and configured to output the background data as the selection data when the selection signal has the second level.

12. The semiconductor system of claim 10, wherein the decoder is configured to decode the count signal to generate the background control signal when the selection signal has the second level.

13. The semiconductor system of claim 8, wherein the signal storage unit is configured to output the background control signal as a background drive signal and the pattern data in response to the first command signal and configured to store the background control signal therein in response to the second command signal.

14. The semiconductor system of claim 13, wherein the output buffer is configured to generate the background data in response to a signal loaded on the background I/O line; and
   wherein a drivability of the background data is controlled according to the background drive signal.

15. The semiconductor system of claim 14, wherein the output buffer includes:
   a first output buffer configured to output the foreground data through a first pad, a drivability of the foreground data being controlled according to the foreground drive signal; and
   a second output buffer configured to output the background data through a second pad, a drivability of the background data being controlled according to the background drive signal.

16. A semiconductor memory device comprising:
   a drive signal generator configured to output a foreground control signal for controlling a drivability of a foreground data as a foreground drive signal in response to a first command signal, configured to store the foreground control signal therein in response to a second command signal, and configured to load a pattern data having a predetermined level combination on a foreground I/O line; and
an output buffer configured to generate the foreground data in response to a signal loaded on the foreground I/O line and configured to output the foreground data through a first pad, wherein a drivability of the foreground data is controlled by a plurality of drivers according to the foreground drive signal, and
   wherein the foreground control signal is configured to be varied a level combination of the foreground control signal according to a delay time of the foreground data outputted through the foreground I/O line.

17. The semiconductor memory device of claim 16, wherein the first command signal includes a first pulse generated when a test mode starts and a second pulse generated when the level combination of the foreground control signal changes; and
   wherein the second command signal includes a pulse generated when the level combination of the foreground control signal does not change.

18. The semiconductor memory device of claim 16, wherein the drive signal generator includes:
   an input buffer configured to buffer the first command signal to generate a first internal command signal and configured to buffer the second command signal to generate a second internal command signal;
   a signal storage unit configured to output the foreground control signal as the foreground drive signal and to output the pattern data in response to the first internal command signal and configured to receive the second internal command signal to store the foreground control signal therein; and
   a data I/O controller configured to load the pattern data on the foreground I/O line in response to the first internal command signal and configured to load an internal data on the foreground I/O line when a test mode terminates.

* * * * *